United States Patent [19]
Calvert et al.

[11] 3,850,282
[45] Nov. 26, 1974

[54] ARTICLE STACKING MECHANISM

[75] Inventors: Rodney K. Calvert, Dunwoody; Roy A. Johnson, Marietta, both of Ga.

[73] Assignee: The Mead Corporation, Dayton, Ohio

[22] Filed: Feb. 27, 1973

[21] Appl. No.: 336,162

[52] U.S. Cl. .................................. 198/35, 198/32
[51] Int. Cl. ........................................ B65g 57/03
[58] Field of Search .................. 198/85, 24, 19, 35

[56] References Cited
UNITED STATES PATENTS

| | | | |
|---|---|---|---|
| 3,004,650 | 10/1961 | Pettee | 198/34 A |
| 3,068,987 | 12/1962 | Franklin | 198/85 |
| 3,352,435 | 11/1967 | Reinecke | 198/35 |
| 3,643,719 | 2/1972 | Kimberling | 198/35 |

*Primary Examiner*—Evon C. Blunk
*Assistant Examiner*—Jeffrey V. Nase
*Attorney, Agent, or Firm*—Walter M. Rodgers

[57] ABSTRACT

A pair of conveyors having their working reaches disposed in generally parallel but vertically divergent relationship impart relative vertical movement to articles thereon and a pair of vertically spaced starwheels disposed at the outfeed ends of said conveyors engage the articles from the conveyors and impart relative transverse movement thereto so as to stack the articles from one conveyor atop the articles from the other conveyor.

9 Claims, 5 Drawing Figures

ARTICLE STACKING MECHANISM

In certain packaging operations it is desirable to arrange the articles to be packaged in two or more layers one above another. After the articles are stacked as desired such, for example, where one row of two or more articles is disposed atop another row of the corresponding number of articles, the entire group of stacked articles is packaged in a wrapper or in some other form of container.

According to this invention, articles to be stacked and ultimately packaged are conveyed on at least two generally parallel conveyors whose working reaches move in vertically divergent directions so that at the outfeed end of the conveyors, the articles on one conveyor are disposed with their bottoms at a level above the tops of the articles on the other conveyor. Article engaging means disposed at the outfeed end of the conveyors engages the articles from each conveyor and imparts relative transverse movement thereto so as to cause the articles from one conveyor to be stacked atop the articles from the other conveyor. Guide means and a stabilizing guide may be disposed alongside and above the article engaging means so as to cooperate therewith in controlling the movement of the articles during the stacking operation and if the articles are provided with flanges which may serve to support the articles in the region of the article engaging means, suitable support elements are mounted in spaced relation relative to the guide means and cooperate therewith to engage diametrically opposite parts of the flanges of the elements during movement thereof by the article engaging means.

Figure 1:
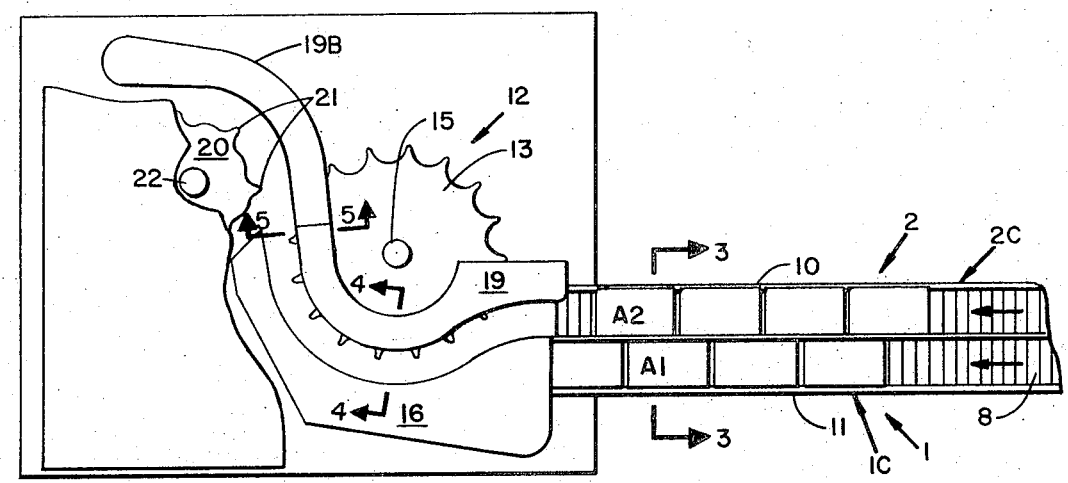
Figure 2:
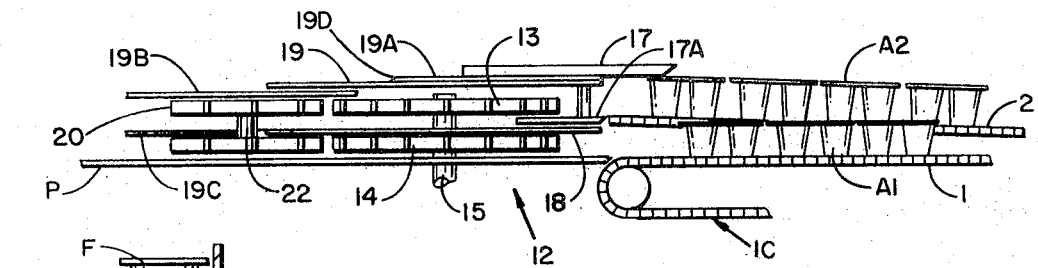
Figure 3:
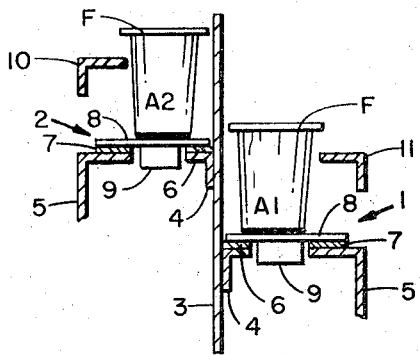
Figure 4:
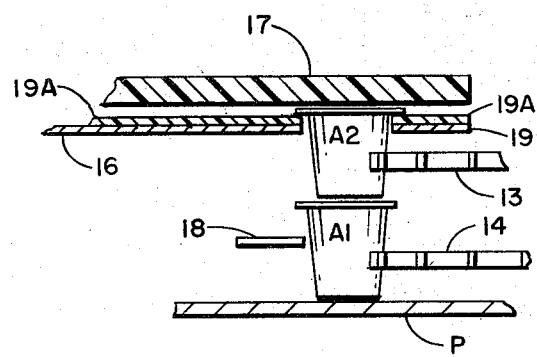
Figure 5:
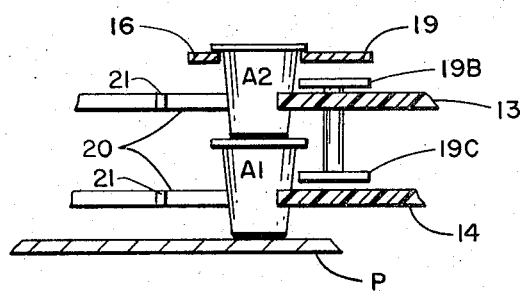

For a better understanding of the invention, reference may be had to the following detailed description taken in conjunction with the accompanying drawings in which FIG. 1 is a plan view of a mechanism constructed according to the invention; FIG. 2 is an elevation of the mechanism shown in FIG. 1; FIG. 3 is a cross sectional view taken along the line designated 3—3 in FIG. 1; FIG. 4 is a cross sectional view taken along the line designated 4—4 in FIG. 1; and in which FIG. 5 is a cross sectional view taken along the line designated 5—5 in FIG. 1.

Articles to be stacked are fed into the mechanism on conveyor means 1C and 2C which include a pair of generally parallel conveyors whose working reaches are designated by the numerals 1 and 2 and which diverge in a vertical direction as is apparent from FIGS. 2 and 3. While working reach 2 of conveyor 2C is shown as moving from right to left in a generally upward direction, it will be understood that the working reach 2 of conveyor 2C could be disposed in a substantially horizontal plane and the working reach 1 of the other conveyor 1C could be inclined downwardly from right to left or, if desired, these could be reversed.

In order to support the two conveyors and to separate the working reaches thereof, a divider element 3 is provided and is supported securely in fixed position to the frame of the machine in a manner not shown in the drawings. An angle iron 4 is secured in any suitable manner to the divider element 3 and another angle element 5 is fixedly mounted and spaced transversely therefrom. A low friction strip 6 is secured atop angle iron 4 while a similar low friction strip 7 is secured atop angle 5. A plurality of slats 8 are secured to flexible belt or chain 9 which is disposed between angles 4 and 5 and their associated low friction elements 6 and 7. The other conveyor is identical in construction and the corresponding parts thereof have been designated by the same numerals as those used to describe the working reach of conveyor 2C designated by the numeral 2.

For the purpose of securing the articles such as A1 and A2 against outward transverse movement, a pair of retaining rails 10 and 11 are provided and are fixed in position to the frame of the machine by any suitable means not shown in the drawings.

The infeed ends of the working reaches 1 and 2 of the parallel conveyors are disposed at substantially the same level. As the working reaches of both conveyors move from right to left as viewed in FIGS. 1 and 2, the working reach 2 moves upward while working reach 1 moves in a substantially horizontal plane so that when an article such as A2 arrives at the outfeed end of working reach 2, such article is at a level such that its bottom end is somewhat above the top of the article A1 disposed on working reach 1 at the outfeed end thereof.

With the articles spaced vertically and offset horizontally as described, it is then simply necessary to impart relative transverse movement thereto in order to effect a stacking operation whereby one article such as A2 rests atop another adjacent article A1. Toward this end movable article engaging means generally designated by the numeral 12 is provided and comprises a pair of vertically spaced article engaging elements designated by the numerals 13 and 14 which may take the form of starwheels mounted on a synchronously rotatable vertically disposed shaft 15 driven by mechanism not shown but which is of conventional construction. Thus as is apparent from FIGS. 1 and 2, starwheel 13 engages an article A2 and moves that article generally downward and to the left as viewed in FIG. 1 while starwheel 14 engages an article A1 without imparting appreciable sidewise or downward movement thereto to complete a stacking operation.

In order to maintain control of the articles after they come in contact with the starwheels 13 and 14, suitable guide means 16 is disposed alongside starwheel 13 and in spaced relation thereto so that the articles A2 may pass between starwheel 13 and the guide means 16.

For the purpose of preventing toppling of articles A2 while the articles are being manipulated by starwheel 13, a stabilizing guide 17 is fixed in position above the starwheel 13 and slightly above the path of movement of the articles A2 so that any tendency of the articles A2 to topple is prevented because the flanges F of the articles A2 are in effect captured between slide plate 19A secured atop guide means 16 and support element 19 and stabilizing guide 17 which is shown in FIGS. 2 and 4 but is not shown in FIG. 1 for the sake of clarity. The guide means 18 and starwheel 14 control the transverse and generally arcuate path of movement of the articles A1 as they move past article engaging element or starwheel 14 as is apparent in FIG. 4.

The articles such as A1 and A2 may be of any conventional construction. As shown in the drawings these articles are provided with flanges designated at F. Thus advantage may be taken of the outwardly extending flanges F as a means of supporting the articles after they leave the working reaches 1 and 2 of the infeed conveyors and while the articles are disposed adjacent article engaging means 12. Thus a flange F of article A2 may rest atop guide means 16 and arcuate support element 19. As shown in the drawing articles A1 are supported on a dead plate P after they leave conveyor 1C. A fixed hold down element 17A slidably engages the tops of articles A1 and prevents toppling of these articles.

As the articles A2 are moved by starwheel 13 with their flanges F riding on slide plate 19A, these articles are spaced slightly above articles A1 as is apparent in FIG. 4. When an article A2 reaches the downwardly bevelled end 19D of slide plate 19A such article is then lowered onto an article A1 disposed therebelow as is apparent in FIG. 5.

Ordinarily it is desirable to separate the articles A1 and A2 into groups after the articles leave the article engaging means 12. Toward this end spacer means 20 is provided with peripheral projections 21 and is supported on a rotatable shaft 22 driven in synchronism with rotation of article engaging means 12. Thus the space between projections 21 is chosen so as to receive one or more articles A1 and A2 and thus to separate such a group from the succeeding group of articles by the peripheral dimension of the projections 21. The groups of articles then may be packaged in individual wrappers or in other suitable devices as may be desired.

For the purpose of holding the stacked articles A1 and A2 adjacent the spacer means 20, a pair of arcuate guides 19B and 19C are disposed alongside the spacer means 20 as is shown in FIG. 5.

The embodiments of the invention in which an exclusive property or privilege is claimed are defined as follows:

1. An article stacking mechanism comprising movable conveyor means for changing the relative elevations of a pair of articles initially disposed near each other and carried by said conveyor means, the change in elevation being such that the bottom of one article is disposed at a level above the top of the other article upon completion of the change in relative elevations of the articles, movable article engaging means including at least two vertically spaced starwheels respectively engageable with the articles for imparting transverse relative movement to said articles so as to establish positions of substantially vertical alinement therebetween, and guide means disposed alongside at least a part of the periphery of each of said starwheels and laterally spaced therefrom in a manner to receive a row of articles therebetween.

2. A mechanism according to claim 1 wherein the articles are provided with outwardly protruding flanges which engage the one of said guide means which is disposed alongside the upper one of said starwheels and wherein a support element is disposed immediately above said one starwheel for engaging the flanges of such articles on the sides thereof opposite from said guide means whereby the articles are supported by said guide means and said support element.

3. A mechanism according to claim 2 wherein a dead plate supports the lower ones of the articles while such articles are controlled by the associated starwheel.

4. A mechanism according to claim 3 wherein a fixed hold down element is disposed above the path of movement of the lower ones of the articles for slidable engagement therewith.

5. A mechanism according to claim 2 wherein a fixed stabilizing guide is disposed immediately above the path of movement of said one article and arranged to prevent toppling of said article.

6. A mechanism according to claim 5 wherein said stabilizing guide is disposed above the outfeed end of said conveyor means and overlies at least a part of said article engaging means.

7. A mechanism according to claim 1 wherein spacer means is disposed downstream from said starwheels and movable in synchronism therewith for engaging predetermined pairs of stacked articles and for establishing lateral spacing therebetween.

8. An article stacking mechanism comprising movable conveyor means for changing the relative elevations of a pair of articles initially disposed near each other and carried by said conveyor means, the change in elevation being such that the bottom of one article is disposed at a level above the top of the other article upon completion of the change in relative elevations of the articles, and movable article engaging means for imparting transverse relative movement to said articles so as to establish positions of substantially vertical alinement therebetween, said article engaging means comprising at least two vertically spaced rotatable starwheel elements respectively engageable with the articles at different levels.

9. A mechanism according to claim 8 wherein each of said article engaging elements comprises at least one article engaging part and wherein said article engaging parts are disposed in substantially vertical alinement with each other.

* * * * *